(12) United States Patent
Wu

(10) Patent No.: US 9,949,061 B2
(45) Date of Patent: Apr. 17, 2018

(54) FAULT MANAGEMENT METHOD AND APPARATUS

(71) Applicant: ZTE CORPORATION, Shenzhen, Guangdong Province (CN)

(72) Inventor: Hao Wu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 23 days.

(21) Appl. No.: 14/904,434

(22) PCT Filed: Oct. 12, 2013

(86) PCT No.: PCT/CN2013/085086
§ 371 (c)(1),
(2) Date: Jan. 12, 2016

(87) PCT Pub. No.: WO2014/166218
PCT Pub. Date: Oct. 16, 2014

(65) Prior Publication Data
US 2016/0212570 A1    Jul. 21, 2016

(30) Foreign Application Priority Data
Jul. 19, 2013  (CN) .......................... 2013 1 0306830

(51) Int. Cl.
*H04W 4/00*       (2009.01)
*H04W 76/02*    (2009.01)
(Continued)

(52) U.S. Cl.
CPC ......... *H04W 4/005* (2013.01); *H04L 41/0663* (2013.01); *H04L 41/0672* (2013.01);
(Continued)

(58) Field of Classification Search
CPC ..... H04W 4/005; H04W 76/02; H04W 24/06; H04L 41/0663; H04L 41/0672; H04L 41/0686; H04L 41/082
See application file for complete search history.

(56) References Cited

U.S. PATENT DOCUMENTS

2008/0295081 A1* 11/2008 Albot .................. G06F 11/3688
717/128
2009/0113232 A1    4/2009 Park et al.
(Continued)

FOREIGN PATENT DOCUMENTS

| CN | 102264087 A | 11/2011 |
| CN | 102487488 A | 1/2012 |
| WO | WO2013030742 A1 | 3/2013 |

*Primary Examiner* — Ajay Cattungal
(74) *Attorney, Agent, or Firm* — Ling Wu; Stephen Yang; Ling and Yang Intellectual Property

(57) ABSTRACT

Disclosed are a fault management method and apparatus. The method includes: an M2M gateway receiving a fault management task sent by an M2M service platform; and the M2M gateway executing the fault management task. The fault management apparatus, applied to a machine to machine (M2M) gateway, comprises: a task receiving module, configured to: receive a fault management task sent by an M2M service platform; and an executing module, configured to: execute the fault management task. The fault management method and apparatus of the present document can be used to realize the M2M platform fault management and solve the M2M platform fault monitoring problem.

10 Claims, 4 Drawing Sheets

(51) Int. Cl.
*H04W 24/04* (2009.01)
*H04L 12/24* (2006.01)
(52) U.S. Cl.
CPC ......... *H04L 41/0686* (2013.01); *H04W 24/04* (2013.01); *H04W 76/02* (2013.01); *H04L 41/082* (2013.01)

(56) References Cited

U.S. PATENT DOCUMENTS

| | | | | |
|---|---|---|---|---|
| 2011/0183685 A1* | 7/2011 | Burton | ............... | G06F 21/316 |
| | | | | 455/456.1 |
| 2011/0264964 A1* | 10/2011 | Murphy | ............. | G06F 11/0709 |
| | | | | 714/48 |
| 2012/0149325 A1* | 6/2012 | Titus | .................. | H04M 11/04 |
| | | | | 455/404.2 |
| 2012/0151272 A1* | 6/2012 | Behrendt | ............... | G06F 9/542 |
| | | | | 714/39 |
| 2012/0151278 A1* | 6/2012 | Tsantilis | ............... | G06F 11/079 |
| | | | | 714/48 |
| 2013/0188515 A1* | 7/2013 | Pinheiro | .............. | H04W 4/001 |
| | | | | 370/254 |
| 2013/0217389 A1* | 8/2013 | Punz | ................. | H04W 60/00 |
| | | | | 455/435.1 |
| 2014/0369288 A1* | 12/2014 | Kim | ................... | H04W 4/005 |
| | | | | 370/329 |

* cited by examiner

FAULT MANAGEMENT METHOD AND APPARATUS

TECHNICAL FIELD

The present document relates to the field of mobile communications, and more particularly, to a fault management method and apparatus.

BACKGROUND OF THE INVENTION

The machine to machine (M2M) communication network extends the communication category and the communication area of existing information communication networks, obtains information from the physical world by embedding intelligence and communication capabilities into a variety of possible objects, and enhances and upgrades intelligence, interaction and degree of automation of existing information communication network services by analyzing and processing the information.

The M2M communication network has a variety of network configurations, it can be an individual physical network constructed separately, or a logical network built on existing public communication networks and a variety of government and enterprise private networks.

In terms of the logic function, the M2M communication network can be divided into three layers, namely, a perception extension layer, a network/service layer and an application layer.

The perception extension layer: the perception extension layer mainly achieves collection, automatic identification and intelligent control of the physical world information. All kinds of things themselves in the physical world do not have communication capability. Sensors, actuators, intelligent devices, Radio Frequency Identification (RFID) readers and other intelligent nodes collect information in the physical world and exchange information with the network layer through the communication module. The main components therein are M2M terminal devices and M2M gateway devices.

The network/service layer: the network/service layer supports the transfer, routing and control of the information of the perception layer, and provides a support for communications between human and things as well as between things and things in the Internet of Things. Combined with the classification of the Internet of Things, the network configurations included in the network layer comprise: communication networks, Internet, as well as industry networks. The main component therein is the M2M platform.

The application layer: the application layer comprises a variety of applications of the Internet of Things, both public services and industry services, and the industry services can be industry public services facing the public, it can also be industry-specific services that meet the particular application needs within the industry, wherein the public services are basic services such as intelligent home and mobile payment, provided for typical public's demands. The industry-specific services are usually facing the industry's particular demands and provide services such as intelligent grids, intelligent transportation, as well as intelligent environment within the industry; wherein part of industry services such as intelligent transportation may also be provided for the public, and are called industry public services. The main component comprised therein is the M2M application server.

The M2M gateway device relays the connection of the M2M terminal device to the service layer and the application layer of the M2M communication network. Some M2M terminal devices may only have the short-range communication function, in order to connect to the wide area network, they need to achieve access to the WAN through the M2M gateway device; Another typical needs is to use the M2M gateway device to achieve the network connection convergence and the information aggregation, to simplify the network connectivity and corresponding management.

The M2M platform provides some common capabilities and supports to the M2M applications, and provides an open interface that enables applications to access and use the network resources and capabilities. Shielding the underlying network implementation from the M2M applications can simplify the complexity of developing applications of the Internet of Things and reduce the costs of developing and deploying the applications of the Internet of Things.

SUMMARY

The embodiment of the present document provides a fault management method and apparatus to solve the M2M platform fault-monitoring problem.

The embodiment of the present document provides a fault management method, comprising:

a Machine to Machine (M2M) gateway receiving a fault management task sent by an M2M service platform; and the M2M gateway executing the fault management task.

Alternatively, a fault management object is the M2M gateway and/or a terminal peripheral registered in the M2M gateway.

Alternatively, the fault management task comprises a fault management task identifier, a fault management object, a fault identifier and a fault treatment mode definition.

Alternatively, the method further comprises: before the M2M gateway receives the fault management task sent by the M2M service platform, the M2M gateway receiving and storing fault management parameters sent by the M2M service platform, wherein the fault management parameters comprise the fault identifier and a fault definition corresponding to the fault identifier.

Alternatively, the fault management task comprises a fault management task identifier, a fault management object, a fault identifier and a fault treatment mode identifier.

Alternatively, the method further comprises: before the M2M gateway receives the fault management task sent by the M2M service platform, the M2M gateway receiving and storing fault management parameters sent by the M2M service platform, wherein the fault management parameters comprise the fault identifier, the fault definition corresponding to the fault identifier, the fault treatment mode identifier, and the fault treatment mode definition.

Alternatively, the M2M gateway executing the fault management task comprises:

the M2M Gateway querying a fault definition corresponding to the fault identifier; and the M2M gateway executing fault monitoring on the fault management object based on the fault definition obtained from the query.

Alternatively, the method further comprises: after the M2M gateway executes the fault management task, when detecting a fault, the M2M gateway searching for a fault treatment mode identifier corresponding to the fault;

querying a fault treatment mode definition according to the fault treatment mode identifier; and executing a fault treatment operation according to the fault treatment mode definition.

The embodiment of the present document further provides a fault management apparatus, applied to a machine to machine (M2M) gateway, wherein the apparatus comprises:

a task receiving module, configured to: receive a fault management task sent by an M2M service platform; and an executing module, configured to: execute the fault management task.

Alternatively, a fault management object is the M2M gateway and/or a terminal peripheral registered in the M2M gateway.

the fault management task comprises a fault management task identifier, a fault management object, a fault identifier and a fault treatment mode definition.

The apparatus further comprises, a first configuration module, configured to: receive and store fault management parameters sent by the M2M service platform, wherein the fault management parameters comprise a fault identifier and a fault definition corresponding to the fault identifier.

Alternatively, the fault management task comprises a fault management task identifier, a fault management object, a fault identifier and a fault treatment mode identifier.

The apparatus further comprises:

a second configuration module, configured to: receive and store fault management parameters sent by the M2M service platform, wherein the fault management parameters comprise a fault identifier and a fault definition corresponding to the fault identifier, a fault treatment mode identifier, and a fault treatment mode definition.

Alternatively, the executing module comprises:

a fault definition querying unit, configured to: query a fault definition corresponding to the fault identifier; and a monitoring unit, configured to: execute fault monitoring on the fault management objects based on the fault definition obtained from the query.

Alternatively, the apparatus further comprises: a fault treatment module, wherein, the fault treatment module comprises:

an identifier searching unit, configured to: when the M2M gateway detects a fault, search for a fault treatment mode identifier corresponding to the fault;

a definition querying unit, configured to: query a fault treatment mode definition according to the fault treatment mode identifier; and a fault treatment unit, configured to: execute a fault treatment operation according to the fault treatment mode definition.

The fault management method and apparatus provided by the embodiment of the present document can be used to realize the M2M platform fault management and solve the M2M platform fault monitoring problem.

PREFERRED EMBODIMENTS OF THE INVENTION

The M2M platform provides some common capabilities and supports to the M2M applications, and provides an open interface through which the applications can access and use the network resources and capabilities. Shielding the underlying network implementation from the M2M applications can simplify the complexity of developing applications of the Internet of Things and reduce the costs of developing and deploying the applications of the Internet of Things.

To solve the fault management of the M2M platform, the embodiment of the present document provides a fault management method and apparatus. Hereinafter in conjunction with the accompanying figures, the embodiments of the present document will be described in detail. It should be noted that in the case of no conflict, embodiments and features in the embodiments of the present application may be arbitrarily combined with each other.

The First Embodiment

First, in conjunction with the accompanying drawings, the first embodiment of the present document will be described.

Figure 1:
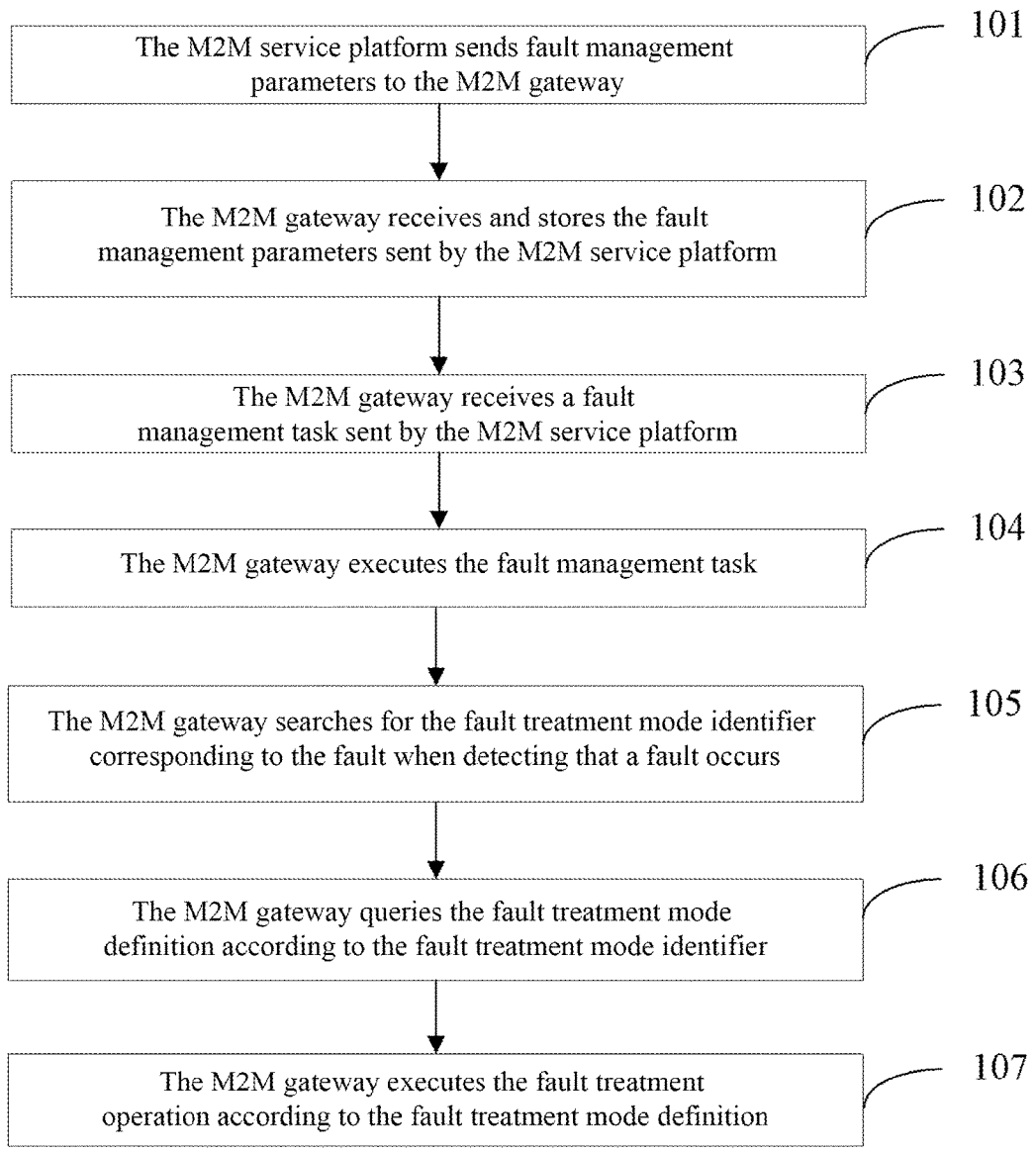
FIG. 1 is a flow chart of a fault management method provided in a first embodiment of the present document.

In the M2M communication network architecture, the gateway, as the functional entity connecting and managing terminal devices in the perception extension layer, can treat faults of the terminal peripheral and the gateway. Based on this, the embodiment of the present document provides a fault management method and uses this method to complete the M2M platform monitoring process, which, as shown in FIG. 1, comprises the following steps:

in step 101, the M2M service platform sends fault management parameters to the M2M gateway.

The fault management parameter configuration solution comprises:

solution one: comprising a fault identifier, a fault definition corresponding to the fault identifier, a fault treatment mode identifier and a fault treatment mode definition;

solution two: comprising a fault identifier and a fault definition corresponding to the fault identifier.

In step 102, the M2M gateway receives and stores the fault management parameters sent by the M2M service platform.

In this step, the M2M gateway stores the received fault management parameters in a local database.

In step 103, the M2M gateway receives a fault management task sent by the M2M service platform.

In this step, the M2M gateway receives the fault management task sent by the M2M service platform. Corresponding to the solution 1 in step 101, the fault management task comprises a fault management task identifier, a fault management object, a fault identifier and a fault treatment mode identifier; corresponding to the solution two in step 101, the fault management task comprises a fault management task identifier, a fault management object, a fault identifier and a fault treatment mode definition.

The fault management object involved in the embodiment of the present document comprises the M2M gateway and/or a terminal peripheral registered in the M2M gateway.

In step 104, the M2M gateway executes the fault management task.

In this step, the M2M gateway locally queries the fault definition corresponding to the fault identifier according to the fault identifier. The M2M gateway queries the fault definition corresponding to the fault identifier, and then the M2M gateway executes fault monitoring on the fault management object according to the fault definition obtained through the query.

Once detecting a fault, the M2M gateway executes a fault treatment operation according to the fault treatment mode in the fault management task, as shown in step 105 to step 107.

In step 105, the M2M gateway searches for the fault treatment mode identifier corresponding to the fault when detecting that a fault occurs.

In step 106, the M2M gateway queries the fault treatment mode definition according to the fault treatment mode identifier.

In step 107, the M2M gateway executes the fault treatment operation according to the fault treatment mode definition.

The Second Embodiment

In the following, in conjunction with the accompanying drawings, the second embodiment of the present document will be described.

Figure 2:
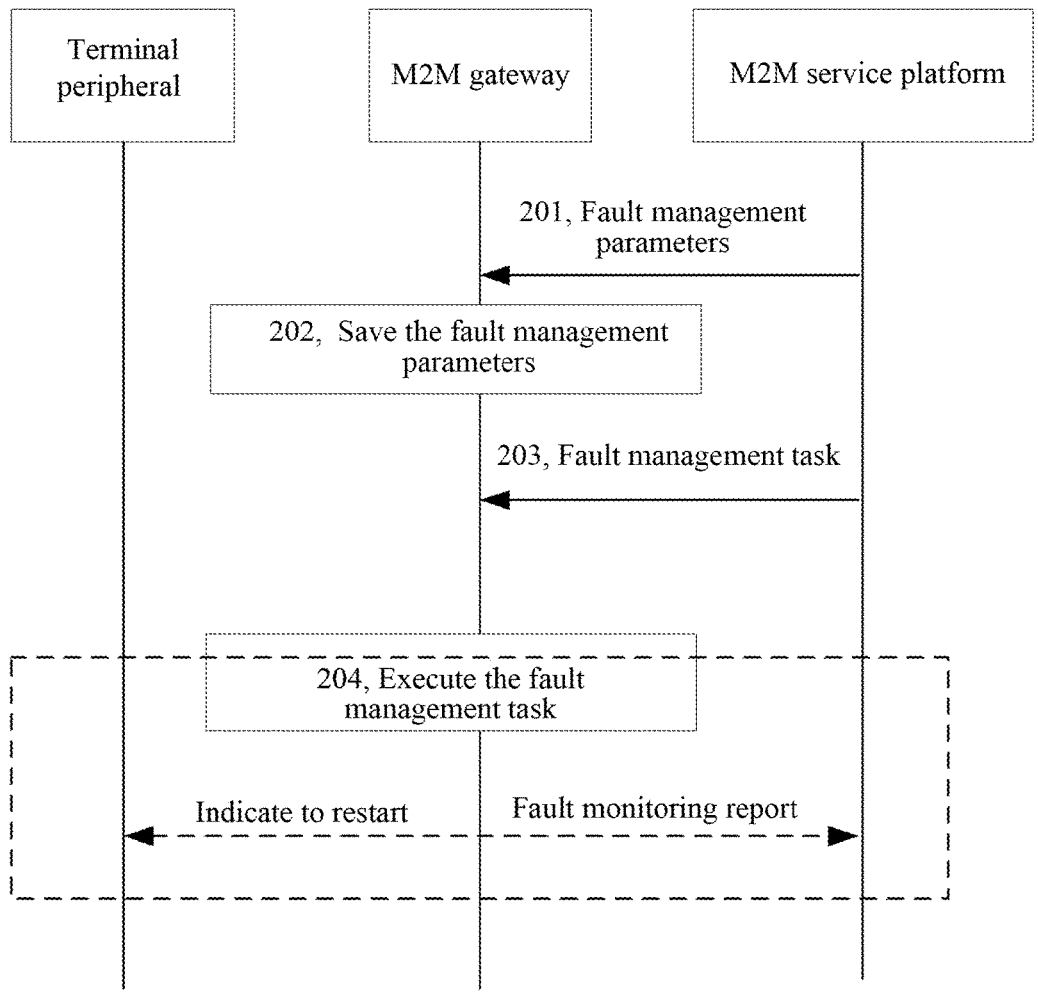
FIG. 2 is a flow chart of a fault management method provided in a second embodiment of the present document.

The embodiment of the present document provides a fault management method, and the process of using this method to monitor faults of the M2M platform is shown in FIG. 2, comprising the following steps:

in step 201, the M2M service platform sends fault management parameters to the M2M gateway, wherein the fault management parameters are shown in Table 1.

TABLE 1

| Fault identifier | Fault definition |
|---|---|
| 00001 | Offline |
| 00002 | Firmware upgrade failed |
| ... | ... |

In step 202, the M2M gateway saves the fault management parameters sent by the M2M service platform in local.

In step 203, the M2M service platform sends the fault management task information to the M2M gateway, and the information carried in the fault management task is shown in Table 2.

TABLE 2

| Fault management task identifier | Fault management object | Fault identifier | Fault treatment mode definition |
|---|---|---|---|
| 10001 | 11111111 | 00001 | report |
| 10002 | 22222222 | 00001 | report |
| 10003 | 22222222 | 00002 | restart |
| ... | ... | ... | ... |

Wherein, "11111111" is the identifier of the terminal peripheral A, "22222222" is the identifier of the terminal peripheral B, the fault identifier in the fault message corresponds to the fault identifier in the fault management parameters in the first step.

In step 204, the M2M gateway executes the fault management task.

In the embodiment of the present document, two fault treatment modes, report and restart, will be taken as examples to describe.

1. it is to execute the fault management task whose fault management task identifier is "10001".

The M2M gateway queried out that the device to be monitored is the terminal peripheral A based on the identifier of the fault management object, and queried out that what to be monitored is whether the terminal peripheral A is offline based on the fault identifier.

The M2M gateway sets a timer Timer1, wherein the timing length is T1 seconds, starts the Timer1 at the beginning of each detection cycle, and sends a detection message to the terminal peripheral A, and the terminal peripheral sends an online feedback message to the M2M gateway after receiving the detection message. If the Timer1 still does not receive the online feedback message from the terminal peripheral A when it times out, the terminal peripheral A is determined as being offline.

Upon detecting that the terminal peripheral A is offline, the M2M gateway sends a fault management report to the M2M service platform according to the fault treatment mode definition, namely, report, in the fault management task information, and the report information comprises the fault management task identifier 10001.

2. it is to execute the fault management task whose fault management task identifier is "10002".

The M2M gateway queried out that the device to be monitored is the terminal peripheral B based on the identifier of the fault management object, and queried out that what to be monitored is whether the terminal peripheral B is offline based on the fault identifier.

The M2M gateway sets a timer Timer2, wherein the timing length is T2 seconds, starts the Timer2 at the beginning of each detection cycle, and sends a detection message to the terminal peripheral B, the terminal peripheral sends an online feedback message to the M2M gateway after receiving the detection message. If the Timer2 still does not receive the online feedback message from the terminal peripheral B when it times out, the terminal peripheral B is determined as being offline.

Upon detecting that the terminal peripheral B is offline, the M2M gateway sends a fault management report to the M2M service platform according to the fault treatment mode definition, namely, report, in the fault management task information, and the report information comprises the fault management task identifier 10002.

3. it is to execute the fault management task whose fault management task identifier is "10003".

The M2M gateway queried out that the device to be monitored is the terminal peripheral B based on the identifier of the fault management object, and queried out that what to be monitored is whether the firmware upgrade of the terminal peripheral B fails based on the fault identifier.

The M2M Gateway pushes the firmware upgrade program of the terminal peripheral B to the terminal peripheral B, if the terminal peripheral B fails to be properly upgraded, the terminal peripheral B feeds back to the M2M Gateway that its firmware upgrade failed, the M2M gateway sends a command to the terminal peripheral B to indicate it to restart according to the fault treatment mode definition, namely, restart, in the fault management task information.

The Third Embodiment

In the following, in conjunction with the accompanying drawings, the third embodiment of the present document will be described.

Figure 3:
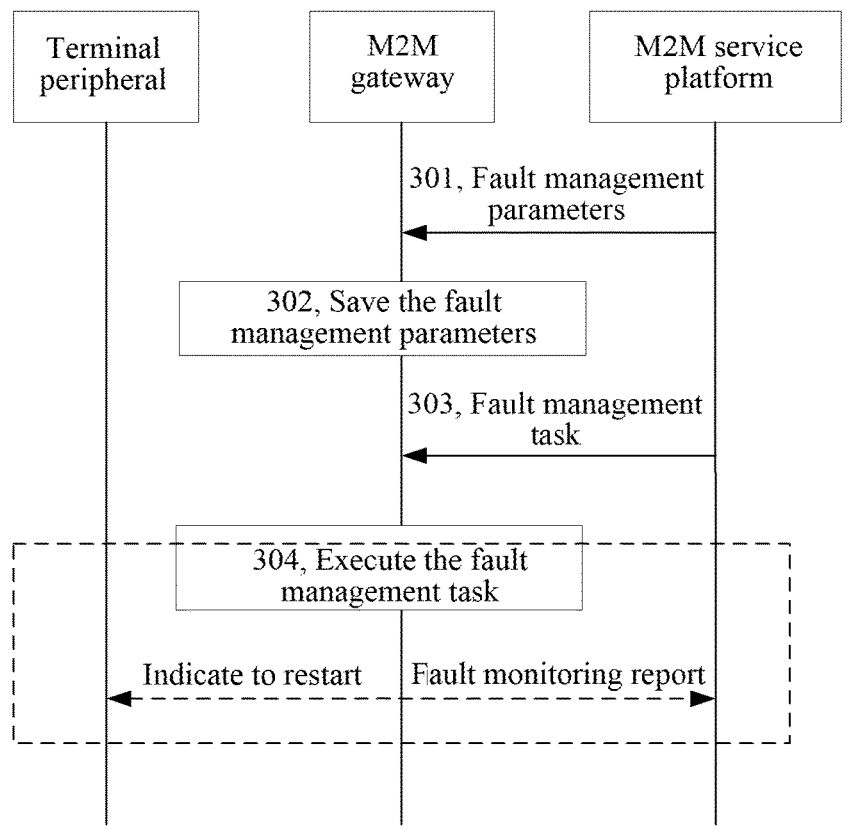
FIG. 3 is a flow chart of a fault management method provided in a third embodiment of the present document.

The embodiment of the present document provides a fault management method and the process of using this method to monitor faults of the M2M platform is shown in FIG. 3, comprising the following steps:

in step 301, the M2M service platform sends fault management parameters to the M2M Gateway, wherein the fault management parameters are shown in Table 3.

TABLE 3

| Fault identifier | Fault definition |
|---|---|
| 00001 | Offline |
| 00002 | Firmware upgrade failed |
| ... | ... |
| Fault treatment mode identifier | Fault treatment mode definition |
| 01001 | Report |
| 01002 | Restart |
| ... | ... |

In step 302, the M2M gateway saves the fault management parameters sent by the M2M service platform in local.

In step 303, the M2M service platform sends the fault management task information to the M2M gateway, and the fault management task information is shown in Table 4.

TABLE 4

| Fault management task identifier | Fault management object | Fault identifier | Fault treatment mode identifier |
|---|---|---|---|
| 10001 | 11111111 | 00001 | 01001 |
| 10002 | 22222222 | 00001 | 01001 |
| 10003 | 22222222 | 00002 | 01002 |
| ... | ... | ... | ... |

Wherein, "11111111" is the identifier of the terminal peripheral A, "22222222" is the identifier of the terminal peripheral B, the identifier in the fault message corresponds to the fault identifier in the fault management parameters in the first step.

In step 304, the M2M gateway executes a fault management task.

In the embodiment of the present document, two fault treatment modes, report and restart, will be taken as examples to describe.

1. it is to execute the fault management task whose fault management task identifier is "10001".

The M2M gateway queried out that the device to be monitored is the terminal peripheral A based on the identifier of the fault management object, and queried out that what to be monitored is whether the terminal peripheral A is offline based on the fault identifier.

The M2M gateway sets a timer Timer1, wherein the timing length is T1 seconds, starts the Timer1 at the beginning of each detection cycle, and sends a detection message to the terminal peripheral A, the terminal peripheral sends an online feedback message to the M2M gateway after receiving the detection message. If the Timer1 still does not receive the online feedback message from the terminal peripheral A when it times out, the terminal peripheral A is determined as being offline.

Upon detecting that the terminal peripheral A is offline, the M2M gateway sends a fault management report to the M2M service platform if the M2M gateway locally queried out that the fault treatment mode is report according to the fault treatment mode identifier "01001" in the fault management task information, wherein the report information comprises the fault management task identifier 10001.

2. it is to execute the fault management task whose fault management task identifier is "10002".

The M2M gateway queried out that the device to be monitored is the terminal peripheral B based on the identifier of the fault management object, and queried out that what to be monitored is whether the terminal peripheral B is offline based on the fault identifier.

The M2M gateway sets a timer Timer2, wherein the timing length is T2 seconds, starts the Timer2 at the beginning of each detection cycle, and sends a detection message to the terminal peripheral B, the terminal peripheral sends an online feedback message to the M2M gateway after receiving the detection message. If the Timer2 still does not receive the online feedback message from the terminal peripheral B when it times out, the terminal peripheral B is determined as being offline.

Upon detecting that the terminal peripheral B is offline, the M2M gateway sends a fault management report to the M2M service platform if the M2M gateway locally queried out that the fault treatment mode definition is report according to the fault treatment mode identifier "01001" in the fault management task information, and the report information comprises the fault management task identifier 10002.

3. it is to execute the fault management task whose fault management task identifier is "10003".

The M2M gateway queried out that the device to be monitored is the terminal peripheral B based on the identifier of the fault management object, and queried out that what to be monitored is whether the firmware upgrade of the terminal peripheral B fails based on the fault identifier.

The M2M gateway pushes the firmware upgrade program of the terminal peripheral B to the terminal peripheral B, if the terminal peripheral B fails to be properly upgraded, the terminal peripheral B feeds back to the M2M Gateway that its firmware upgrade failed, the M2M gateway locally queried out that the fault treatment mode definition is restart according to the fault treatment mode identifier in the fault management task information, and sends a command to the terminal peripheral B to indicate it to restart.

The Fourth Embodiment

In the following, in conjunction with the accompanying drawings, the fourth embodiment of the present document will be described.

Figure 4:
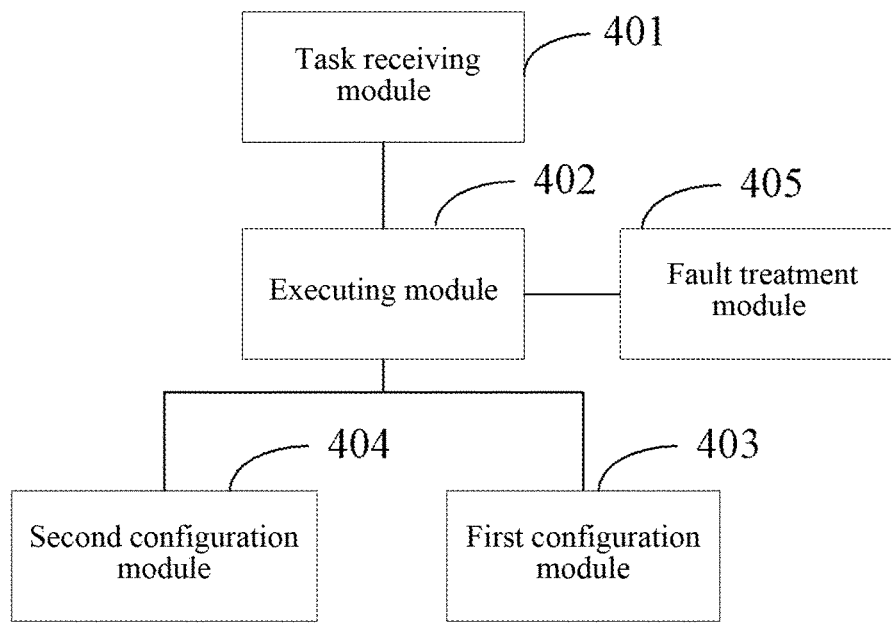
FIG. 4 is a block diagram of a fault management apparatus provided in a fourth embodiment of the present document.

The embodiment of the present document provides a fault management apparatus, wherein the structure of the apparatus is shown in FIG. 4, and comprises:

A task receiving module 401, used to: receive a fault management task sent by an M2M service platform; and An executing module 402, used to: execute the fault management task.

Alternatively, the fault management task comprises a fault management task identifier, a fault management object, a fault identifier and a fault treatment mode definition.

The apparatus further comprises,

A first configuration module 403, used to: receive and store fault management parameters sent by the M2M service platform, wherein the fault management parameters comprise a fault identifier and a fault definition corresponding to the fault identifier.

Alternatively, the fault management task comprises a fault management task identifier, a fault management object, a fault identifier and a fault treatment mode identifier.

The apparatus further comprises:

A second configuration module 404, used to: receive and store fault management parameters sent by the M2M service platform, wherein the fault management parameters comprise a fault identifier, a fault definition corresponding to the fault identifier, a fault treatment mode identifier, and a fault treatment mode definition.

Figure 5:
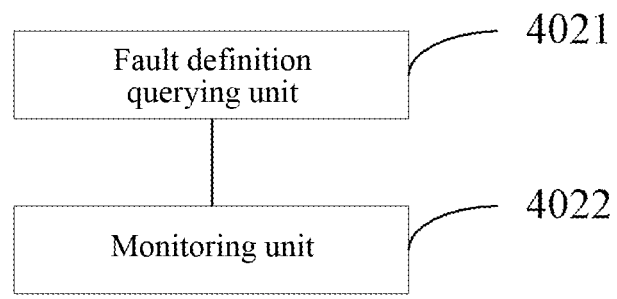
FIG. 5 is a block diagram of an executing module 402 in FIG. 4.

Alternatively, the structure of the executing module 402 is shown in FIG. 5, comprising:

A fault definition querying unit 4021, used to: query a fault definition corresponding to the fault identifier; and A monitoring unit 4022, used to: execute fault monitoring on the fault management object based on the fault definition obtained from the query.

Figure 6:
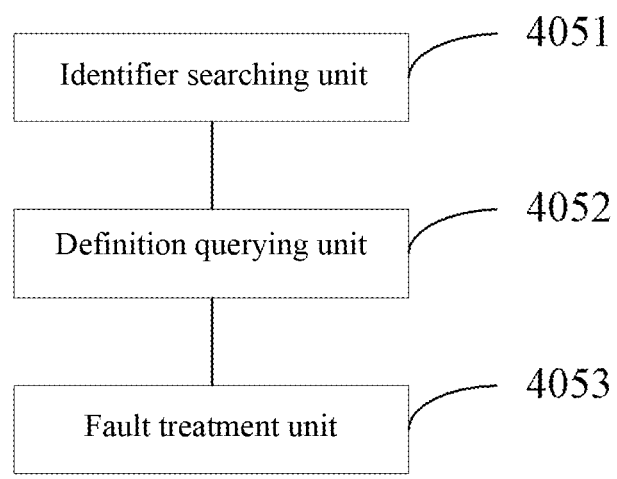
FIG. 6 is a block diagram of a fault treatment module 405 in FIG. 4.

Alternatively, the apparatus further comprises a fault treatment module 405, and the structure of the fault treatment module 405 is shown in FIG. 6, comprising:

An identifier searching unit 4051, used to: when the M2M gateway detects a fault, search for a fault treatment mode identifier corresponding to the fault;

A definition querying unit 4052, used to: query a fault treatment mode definition corresponding to the fault treatment mode identifier; and A fault treatment unit 4053, used to: according to the fault treatment mode definition, execute a fault treatment operation.

The abovementioned fault management device can be integrated in the M2M gateway and the corresponding functions are implemented by the M2M gateway.

With the fault management method and apparatus provided in the embodiment of the present document, the M2M gateway receives fault management tasks sent by the M2M service platform, and then the M2M gateway executes the fault management tasks, realizing the fault management of the M2M platform and solving the fault monitoring problem of the M2M platform.

Those ordinarily skilled in the art can understand that all or some of the steps of the abovementioned embodiments may be implemented using a computer program process, and the computer program may be stored in a computer-readable storage medium and executed on an appropriate hardware platform (such as a system, equipment, apparatus, device, and so on), and during the execution, it comprises one of the steps of the method embodiment or a combination thereof.

Alternatively, all or some of the steps of the abovementioned embodiments can also be implemented with integrated circuits, these steps may be made into individual integrated circuit modules respectively, or some of the modules or steps can be made into a single integrated circuit module to implement. Therefore, the present document is not limited to any specific combination of hardware and software.

Each device/functional module/functional unit in the abovementioned embodiments may be implemented with universal computing devices, they can be concentrated on a single computing device or distributed on a network composed of a plurality of computing devices.

When each device/functional module/functional unit in the abovementioned embodiments are implemented in the form of software functional module and sold or used as an individual product, they may be stored in a computer readable storage medium. The abovementioned computer-readable storage medium may be a read-only memory, magnetic or optical disk, and the like.

A person skilled in the art can easily conceive changes or replacements within the technical scope disclosed in the present document, and these changes and replacements should fall in the protection scope of the appended claims of the present document. Accordingly, the protection scope of the present document should be the protection scope of the claims.

INDUSTRIAL APPLICABILITY

The method and apparatus in accordance with the embodiment of the present document can be used to realize the fault management of the M2M platform and solve the fault monitoring problem of the M2M platform.

What is claimed is:

1. A fault management method, comprising:
    a Machine to Machine (M2M) gateway receiving a fault management task sent by an M2M service platform; and
    the M2M gateway executing the fault management task; wherein,
    the fault management task comprises a fault management task identifier, a fault management object, a fault identifier and a fault treatment mode definition; wherein,
    the M2M gateway executing the fault management task comprises:
    the M2M Gateway querying a fault definition corresponding to the fault identifier; and
    the M2M gateway executing fault monitoring on the fault management object based on the fault definition obtained from the query.

2. The method of claim 1, wherein, a fault management object is the M2M gateway and/or a terminal peripheral registered in the M2M gateway.

3. The method of claim 1, further comprising: before the M2M gateway receives the fault management task sent by the M2M service platform,
    the M2M gateway receiving and storing fault management parameters sent by the M2M service platform, wherein the fault management parameters comprise the fault identifier and a fault definition corresponding to the fault identifier.

4. The method of claim 1, wherein, the fault management task comprises a fault management task identifier, a fault management object, a fault identifier and a fault treatment mode identifier.

5. The method of claim 4, further comprising: before the M2M gateway receives the fault management task sent by the M2M service platform, the M2M gateway receiving and storing fault management parameters sent by the M2M service platform, wherein the fault management parameters comprise a fault identifier, a fault definition corresponding to the fault identifier, a fault treatment mode identifier, and a fault treatment mode definition.

6. The method of claim 5, further comprising: after the M2M gateway executes the fault management task,
    when detecting a fault, the M2M gateway searching for a fault treatment mode identifier corresponding to the fault;
    querying a fault treatment mode definition according to the fault treatment mode identifier; and
    executing a fault treatment operation according to the fault treatment mode definition.

7. A fault management apparatus, applied to a machine to machine (M2M) gateway, wherein the apparatus comprises:
    a task receiving circuit, configured to: receive a fault management task sent by an M2M service platform; and
    an executing circuit, configured to: execute the fault management task; wherein,
    a fault management object is the M2M gateway and/or a terminal peripheral registered in the M2M gateway;
    the fault management task comprises a fault management task identifier, a fault management object, a fault identifier and a fault treatment mode definition;

the apparatus further comprises,
a first configuration circuit, configured to: receive and store fault management parameters sent by the M2M service platform, wherein the fault management parameters comprise a fault identifier and a fault definition corresponding to the fault identifier; wherein,
the executing circuit comprises:
a fault definition querying unit, configured to: query a fault definition corresponding to the fault identifier; and
a monitoring unit, configured to: execute fault monitoring on the fault management object based on the fault definition obtained from the query.

8. The apparatus of claim 7, wherein,
the fault management task comprises a fault management task identifier, a fault management object, a fault identifier and a fault treatment mode identifier;
the apparatus further comprises:
a second configuration circuit, configured to: receive and store fault management parameters sent by the M2M service platform, wherein the fault management parameters comprise a fault identifier and a fault definition corresponding to the fault identifier, a fault treatment mode identifier, and a fault treatment mode definition.

9. The apparatus of claim 8, further comprising: a fault treatment module, wherein,
the fault treatment circuit comprises:
an identifier searching unit, configured to: when the M2M gateway detects a fault, search for a fault treatment mode identifier corresponding to the fault;
a definition querying unit, configured to: query a fault treatment mode definition according to the fault treatment mode identifier; and
a fault treatment unit, configured to: execute a fault treatment operation according to the fault treatment mode definition.

10. The apparatus of claim 7, further comprising: a fault treatment circuit, wherein,
the fault treatment module comprises:
an identifier searching unit, configured to: when the M2M gateway detects a fault, search for a fault treatment mode identifier corresponding to the fault;
a definition querying unit, configured to: query a fault treatment mode definition according to the fault treatment mode identifier; and
a fault treatment unit, configured to: execute a fault treatment operation according to the fault treatment mode definition.

* * * * *